(12) United States Patent
Guo et al.

(10) Patent No.: US 8,437,430 B2
(45) Date of Patent: May 7, 2013

(54) REMOTE TRANSMIT IQ IMBALANCE CALIBRATION AND CORRECTION AT MULTICARRIER RECEIVERS

(75) Inventors: Yongfang Guo, Santa Clara, CA (US); Kennan Herbert Laudel, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 643 days.

(21) Appl. No.: 12/655,192

(22) Filed: Dec. 23, 2009

(65) Prior Publication Data

US 2011/0150112 A1    Jun. 23, 2011

(51) Int. Cl.
*H04L 25/06* (2006.01)

(52) U.S. Cl.
USPC ........ 375/319; 375/346; 455/501; 455/67.13; 455/305

(58) Field of Classification Search .................. 375/229, 375/232, 235, 257, 261, 284, 285, 317, 319, 375/346, 349, 350, 340; 455/501, 63.1, 67.11, 455/67.13, 67.14, 226.1–226.3, 296, 304–306
See application file for complete search history.

(56) References Cited

U.S. PATENT DOCUMENTS

| | | | |
|---|---|---|---|
| 7,035,341 B2 * | 4/2006 | Mohindra | 375/261 |
| 2008/0165874 A1 * | 7/2008 | Steele et al. | 375/261 |
| 2011/0069744 A1 * | 3/2011 | Laudel et al. | 375/219 |
| 2012/0093244 A1 * | 4/2012 | Levi et al. | 375/259 |

* cited by examiner

*Primary Examiner* — Dac Ha
(74) *Attorney, Agent, or Firm* — Grossman, Tucker, Perreault & Pfleger, PLLC (57) ABSTRACT

Transmit IQ imbalance is calibrated and compensated for within a receiver. In at least one embodiment, a Multimedia over Coax Alliance (MoCA) Type II probe signal is transmitted from the transmitter to the receiver for use in performing transmit IQ imbalance calibration.

21 Claims, 4 Drawing Sheets

REMOTE TRANSMIT IQ IMBALANCE CALIBRATION AND CORRECTION AT MULTICARRIER RECEIVERS

TECHNICAL FIELD

The invention relates generally to communications and, more particularly, to techniques for calibrating and correcting IQ imbalance in wireline and wireless communication systems.

BACKGROUND OF THE INVENTION

Communication transmitters often use IQ modulation to modulate carrier waves with data to be transmitted. A problem that may occur in a system using IQ modulation is transmit IQ imbalance, which is basically an imbalance between the in-phase and quadrature components of a transmitted signal. Techniques are needed for efficiently and accurately performing transmit IQ imbalance calibration and/or compensation in a receiving device.

DETAILED DESCRIPTION

In the following detailed description, reference is made to the accompanying drawings that show, by way of illustration, specific embodiments in which the invention may be practiced. These embodiments are described in sufficient detail to enable those skilled in the art to practice the invention. In the drawings, like numerals refer to the same or similar functionality throughout the several views.

The present invention relates to techniques that may be used to calibrate and correct for IQ imbalance in a remote transmitter from the receiver side of the communication. In one implementation, the techniques are adapted for use with the multimedia over coax alliance (MoCA) communication standard, however many other applications exist (both wireline and wireless). By performing the IQ imbalance calibration on the receiver side, it was determined that system performance could be improved substantially over calibration techniques of the past. The techniques of the present invention may be used in conjunction with orthogonal frequency division multiplexing (OFDM) systems, orthogonal frequency division multiple access (OFDMA) systems, and for systems using other multicarrier technologies.

In the MoCA standard, there is no specification for IQ imbalance at the transmitter, except for an error vector magnitude (EVM) requirement of −30 dB. In order to correctly receive 256 quadrature amplitude modulation (256 QAM) data, the signal to noise ratio (SNR) at the decoder input needs to be at least 30 dB. If RF noise figure (5 dB) and base band implementation loss (3 dB) are taken into account, an EVM of −38 dB is required at the transmitter. Based on the above, it was determined that the transmitter IQ imbalance calibration should be performed at the receiver side to improve the system performance and bring the EVM down at the receiver side in order to enable the use of 256 proper QAM modulation in the MoCA link.

Figure 1:
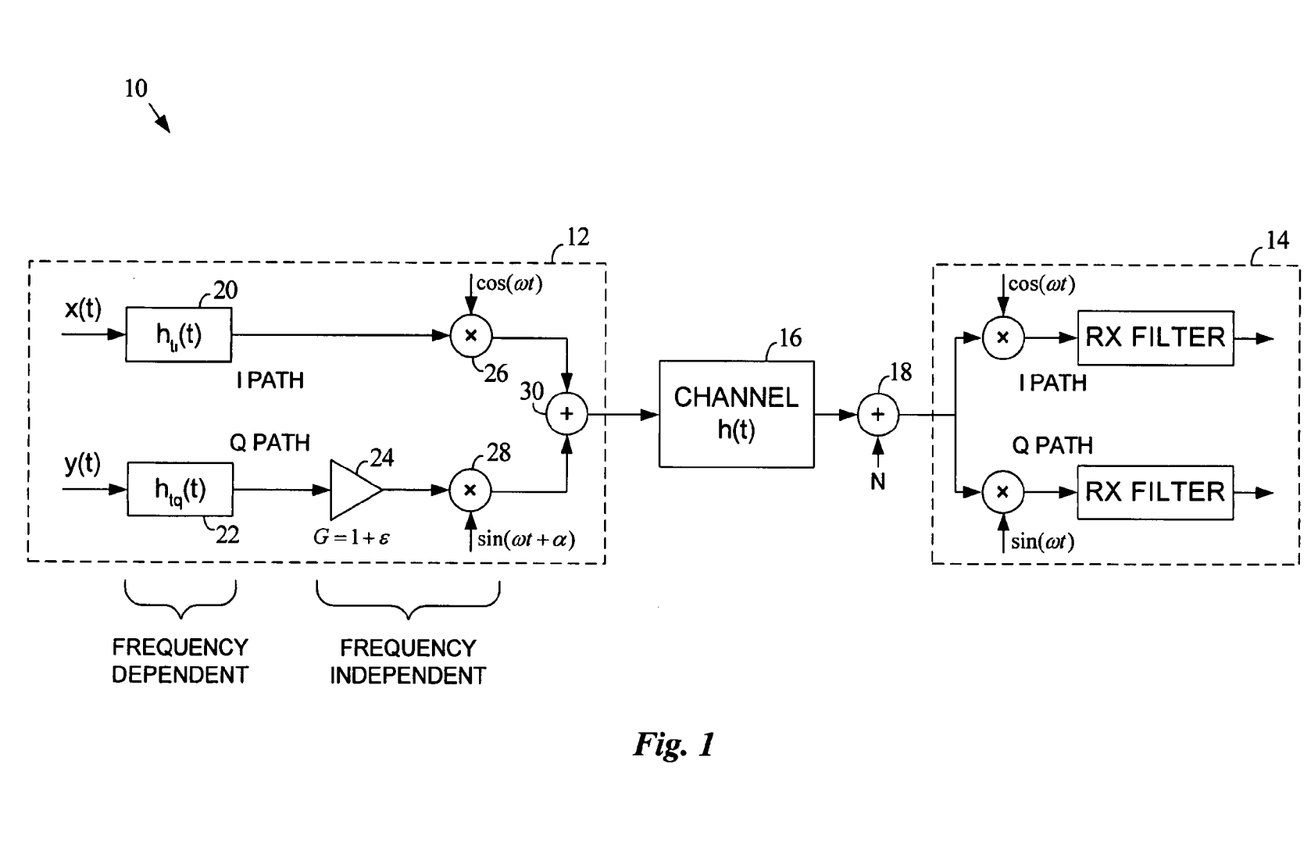
FIG. 1 is a block diagram illustrating a communication arrangement that may incorporate features of the present invention.

FIG. 1 is a block diagram illustrating a communication arrangement 10 that may incorporate features of the present invention. As shown, the communication arrangement 10 includes a transmitter 12 communicating with a receiver 14 through a channel 16 that includes added noise 18. In at least one embodiment, the communication arrangement 10 is part of a MoCA compliant communication network, although non-MoCA applications also exist for features of the invention. In the arrangement 10 of FIG. 1, data is transmitted from the transmitter 12 using IQ modulation. That is, both an in-phase (or I) channel and a quadrature (or Q) channel are used to transmit data. Assuming that the signal to be transmitted is complex (i.e., z=x+jy), the transmitter 12 will transmit x in the in-phase channel and y in the quadrature channel. This may be achieved by using x to modulate a cos($\omega$t) carrier signal and y to modulate a sin($\omega$t) carrier signal. The two modulated carriers may then be combined together and transmitted into the channel. At the receiver side, the received signal is be separated into an in-phase (I) component and a quadrature (Q) component before further receiver processing is undertaken.

Ideally, in the transmitter, the in-phase signal and the quadrature signal have the same magnitude and are 90 degrees out of phase. If not, then an IQ imbalance is said to exist. For various reasons, an IQ imbalance can degrade the quality of communication in the underlying network. Therefore, limits may be placed on the amount of IQ imbalance that is allowed to exist. To stay within the limits, calibration and compensation may be used to reduce the amount of IQ imbalance that exists. In accordance with the present invention, calibration and compensation for transmitter IQ imbalance are undertaken within the receiver.

In conceiving the present invention, it was appreciated that IQ imbalance may have various causes, which can be both frequency dependent and frequency independent. Referring to FIG. 1, frequency dependent IQ imbalance can be represented by a first transfer function $h_{ti}(t)$ 20 within the in-phase (I) path and a second transfer function $h_{tq}(t)$ 22 within the quadrature (Q) path of the transmitter 12. The ideal baseband signal in the time domain without IQ imbalance can be expressed as:

$$z(t)=x(t)+jy(t).$$

where x(t) is the in-phase component and y(t) is the quadrature component. With the frequency dependent IQ imbalance added in, the baseband signal becomes:

$$z'(t)=h_{ti}(t) \otimes x(t)+jh_{tq}(t) \otimes y(t)=x'(t)+jy'(t)$$

where $\otimes$ is the convolution operator.

The frequency independent IQ imbalance may include both a gain (or magnitude) imbalance and a phase imbalance. In FIG. 1, the gain imbalance is represented as an amplifier 24 having a gain of (1+$\epsilon$). Thus, the Q path has $\epsilon$ more gain than the I path. As illustrated, the transmitter 12 also includes an in-phase mixer 26 and a quadrature mixer 28. The in-phase mixer 26 is used to mix the in-phase baseband signal by a cosine carrier (cos($\omega$t)) and the quadrature mixer 28 is used to mix the quadrature baseband signal by a sine carrier (sin($\omega$t)). However, as shown in FIG. 1, a phase term $\alpha$ is added to the phase of the sine carrier signal in the Q path to represent the frequency independent phase imbalance. An adder 30 is used to combine the modulated sine carrier and the modulated cosine carrier together before transmission into the channel. With the frequency independent IQ imbalance added, the baseband signal becomes:

$$z''(t) = z'(t) + j(1+\varepsilon)e^{-j\alpha}y'(t)$$

$$= \frac{z'(t) + z'^*(t)}{2} + j(1+\varepsilon)e^{-j\alpha}\frac{z'(t) - z'^*(t)}{2}$$

$$= \frac{1 + (1+\varepsilon)e^{-j\alpha}}{2}z'(t) + \frac{1 - (1+\varepsilon)e^{-j\alpha}}{2}z'^*(t)$$

$$= \frac{h_{ti}(t) + (1+\varepsilon)e^{-j\alpha}h_{tq}(t)}{2} \otimes z(t) + \frac{h_{ti}(t) - (1+\varepsilon)e^{-j\alpha}h_{tq}(t)}{2} \otimes z^*(t)$$

where * represents the complex conjugate. In the frequency domain, the above equation becomes:

$$Z''(F) = \frac{H_{ti}(F) + (1+\varepsilon)e^{-j\alpha}H_{tq}(F)}{2}Z(F) + \frac{H_{ti}(F) - (1+\varepsilon)e^{-j\alpha}H_{tq}(F)}{2}Z^*(-F).$$

If it is assumed that $H_{tq}(F)=g(F)H_{ti}(F)e^{-j\beta(F)}$ where $g(F)$ and $\beta(F)$ are linear functions of F, then the above expression becomes:

$$Z''(F) = H_{ti}(F)\left\{\frac{1 + (1+\varepsilon)g(F)e^{-j(\alpha+\beta(F))}}{2}Z(F) + \frac{1 - (1+\varepsilon)g(F)e^{-j(\alpha+\beta(F))}}{2}Z^*(-F)\right\}.$$

Now, substituting $1+\epsilon(F)$ for $(1+\epsilon)g(F)$ and $\alpha(F)$ for $(\alpha+\beta(f))$:

$$Z''(F) = H_{ti}(F)\left\{\frac{1 + (1+\varepsilon(F))e^{-j\alpha(F)}}{2}Z(F) + \frac{1 - (1+\varepsilon(F))e^{-j\alpha(F)}}{2}Z^*(-F)\right\}$$

And further substituting $a(F)$ for $1+(1+\epsilon(F))e^{-j\alpha(F)}$ and $b(F)$ for $1-(1+\epsilon(F))e^{-j\alpha(F)}$, the equation reduces to:

$$Z''(F)=H_{ti}(F)\{a(F)Z(F)+b(F)Z^*(-F)\}.$$

This frequency domain representation shows that the transmit signal with IQ imbalance includes information on both the transmit tone (i.e., F) and an image tone (i.e., −F).

After the transmit signal with IQ imbalance has been transmitted, it propagates through the channel 16, 18 and is received by the receiver 14. In the frequency domain, the received signal $R(F)$ may be expressed as:

$$R(F)=H(F)Z''(F)+N$$

where $H(F)$ is the frequency domain channel matrix and N is the noise. Substituting for $Z''(F)$ results in:

$$R(F)=H(F)H_{ti}(F)\{a(F)Z(F)+b(F)Z^*(-F)\}+N.$$

To perform channel estimation within the communication arrangement 10 of FIG. 1, a channel estimation (CE) sequence may be transmitted from the transmitter 12 to the receiver 14. When transmit IQ imbalance is present, the signal received by the receiver 14 may be expressed as:

$$R(F)=H(F)\{a(F)C(F)+b(F)C^*(-F)\}+N$$

where $C(F)$ is the CE sequence with values of +1 and −1. The channel estimation in the receiver may be performed as follows:

$$\hat{H}(F)=C(F)R(F)=H(F)\{a(F)+b(F)C(F)C^*(-F)\}+N$$

where $\hat{H}(F)$ is the channel estimate. It is apparent that there is an IQ imbalance term in the channel estimate $\hat{H}(F)$. To correct the channel estimate, this IQ imbalance term should be taken out. This can be performed as follows:

$$\tilde{H}(F) = \frac{\hat{H}(F)}{a(F)+b(F)C(F)C^*(-F)}$$

$$= \begin{cases} \hat{H}(F) & \text{when } C(F)C^*(-F)=1 \\ \dfrac{\hat{H}(F)}{(1+\varepsilon(F))e^{-j\alpha(F)}} & \text{when } C(F)C^*(-F)=-1 \end{cases}$$

where $\tilde{H}$ is the corrected channel.

Figure 2:
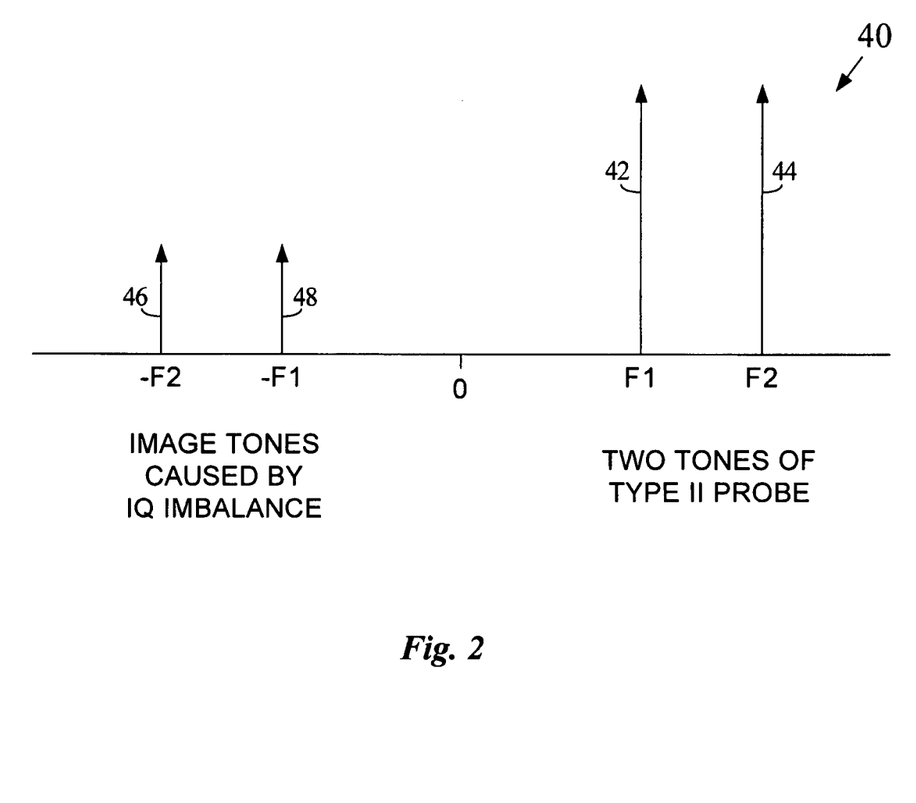
FIG. 2 is a diagram illustrating a Type II probe that may be used to perform IQ imbalance calibration in accordance with an embodiment of the present invention.

As described previously, in one aspect of the present invention, transmitter IQ calibration is performed at the receiver. The MoCA standard uses "probe" signals to determine the frequency response of the channel between a transmitter and a receiver at the various OFDM subcarrier frequencies. In at least embodiment of the present invention, a Type II probe is used to perform the IQ calibration in the receiving device. In a type II probe, there are only two tones used for transmission. For example, FIG. 2 illustrates a Type II probe 40 that includes tones 42, 44 at frequencies F1 and F2, respectively. As shown, the Type II probe also includes image tones 46, 48 at frequencies −F1 and −F2, respectively. Referring back to FIG. 1, the Type II probe 40 may be transmitted from the transmitter 12 to the receiver 14 during a calibration operation. For the tone at frequency F1, the received signal may be expressed as:

$$R(F1) = H(F1)\left\{\frac{1 + (1+\varepsilon(F))e^{-j\alpha(F1)}}{2}\right\}Z(F1)$$

where $Z(F1)=4.7610+j4.7610$ is the Type II probe data. After frequency domain equalization (FEQ), the equalized signal becomes:

$$y(F1) = \frac{\hat{H}^*(F1)R(F1)}{\hat{H}^*(F1)\hat{H}(F1)}$$

$$= \begin{cases} \dfrac{1 + (1+\varepsilon(F1))e^{-j\alpha(F1)}}{2}Z(F1) & \text{when } C(F)C^*(-F)=1 \\ \dfrac{1 + (1+\varepsilon(F1))e^{-j\alpha(F1)}}{2(1+\varepsilon(F))e^{-j\alpha(F)}}Z(F1) & \text{when } C(F)C^*(-F)=1 \end{cases}$$

This leads to:

$$y'(F1) = \frac{2y(F1)Z*(F1)}{Z^*(F1)Z(F1)}$$

$$= \begin{cases} 1 + (1+\varepsilon(F1))e^{-j\alpha(F1)} & \text{when } C(F)C^*(-F)=1 \\ 1 + \dfrac{1}{(1+\varepsilon(F1))e^{-j\alpha(F1)}} & \text{when } C(F)C^*(-F)=-1 \end{cases}$$

Therefore, when $C(F)C^*(-F)=1$, the phase and gain of the IQ imbalance at frequency F1 is given by:

$$\hat{\alpha}(F1) = -\text{angle}(y'(F1) - 1)$$

$$1 + \hat{\varepsilon}(F1) = abs(y'(F1) - 1)$$

and when $C(F)C^*(-F) = -1$, the phase and gain of the IQ imbalance at frequency F1 is given by:

$$\hat{\alpha}(F1) = \text{angle}(y'(F1) - -1)$$

$$1 + \hat{\varepsilon}(F1) = 1/abs(y'(F1) - 1)$$

The phase and gain imbalance at frequency F2 can be calculated in the same manner. Using the linear relationship between the frequency dependent imbalance and frequency, the slope of the phase and gain imbalance can be calculated as follows:

$$\text{angleslope} = \frac{\hat{\alpha}(F2) - \hat{\alpha}(F1)}{F2 - F1}$$

$$\text{absslope} = \frac{\hat{\varepsilon}(F2) - \hat{\varepsilon}(F1)}{F2 - F1}$$

It follows that the y-intercept of the phase and gain imbalance lines (which are linear) may be calculated as:

$$\text{angle intercept} = \hat{\alpha}(F1) - F1 * \text{angleslope}$$

$$\text{abs intercept} = 1 + \hat{\varepsilon}(F1) - F1 * \text{absslope}$$

Given the intercept and slope of the phase and gain imbalance, the phase and gain imbalance at each tone can be obtained. The value of $a(F)$ and $b(F)$ at each tone frequency may then be estimated as follows:

$$a(F) = \frac{1 + (1 + \hat{\varepsilon}(F))e^{-j\hat{\alpha}(F)}}{2}$$

$$b(F) = \frac{1 - (1 + \hat{\varepsilon}(F))e^{-j\hat{\alpha}(F)}}{2}$$

After the calibration has been completed, the results of the calibration may be used to perform IQ imbalance compensation within the receiver. When a signal having IQ imbalance is transmitted to a receiving device, as described above, the received signal is:

$$R(F) = H(F)H_a(F)\{a(F)Z(F) + b(F)Z^*(-F)\} + N.$$

The data at tone F1 and image tone −F1 in the above equation, after FEQ, is in the form:

$$\hat{Z}(F1) = a(F1)Z(F1) + b(F1)Z^*(-F1); \text{ and}$$

$$\hat{Z}(-F1) = a(-F1)Z(-F1) + b(-F1)Z^*(F1)$$

The recovered data after IQ imbalance compensation is then given by:

$$Z(F1) = \frac{a^*(-F1)\hat{Z}(F1) - b(F1)\hat{Z}^*(-F1)}{a^*(-F1)a(F1) - b(F1)b^*(-F1)}.$$

Figure 3:
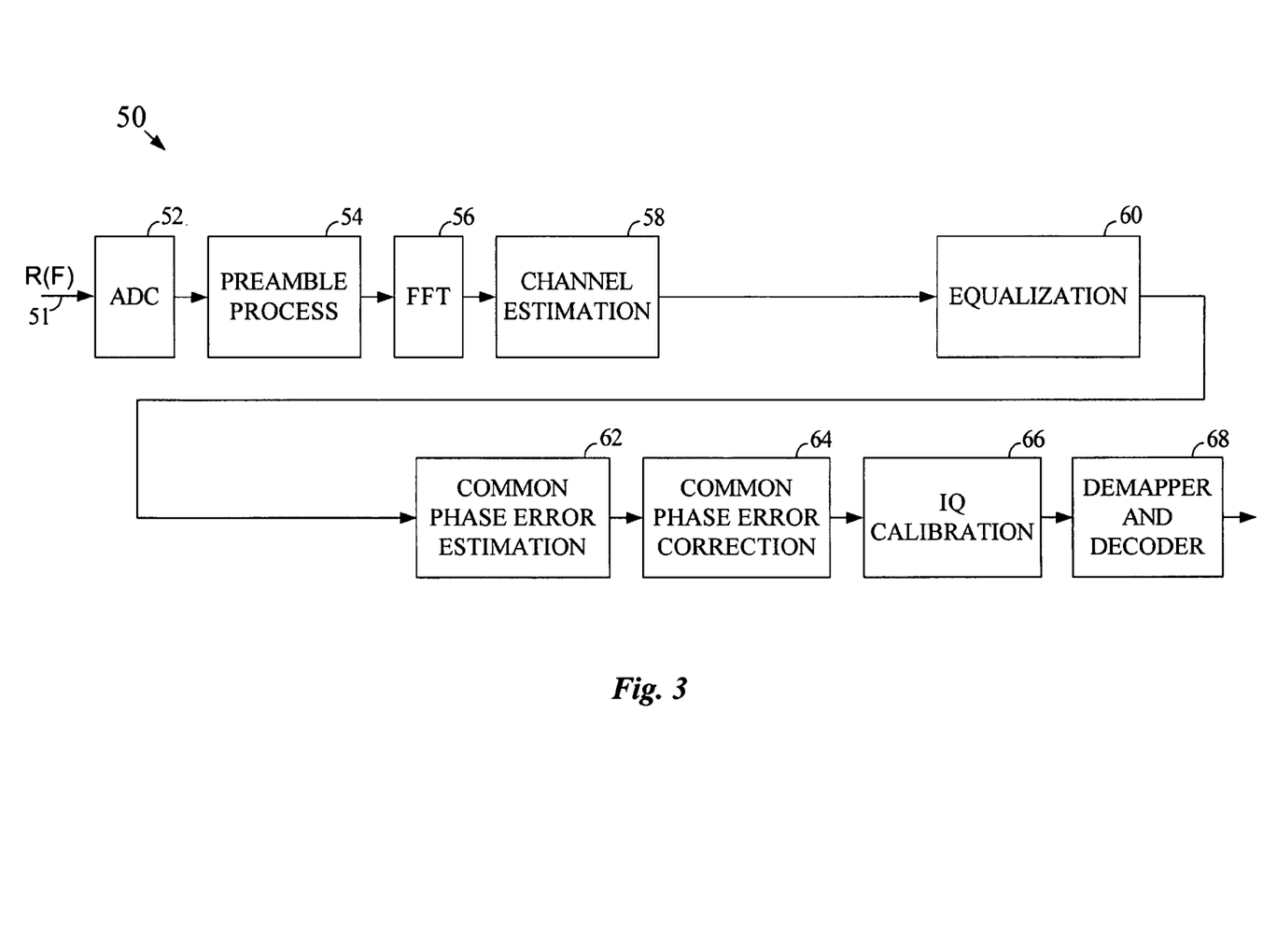
FIG. 3 is a block diagram illustrating an example receiver apparatus that is capable of performing transmitter IQ calibration for a remote transmitter in accordance with an embodiment of the present invention.

FIG. 3 is a block diagram illustrating an example receiver apparatus 50 that is capable of performing transmitter IQ calibration for a remote transmitter in accordance with an embodiment of the present invention. The block diagram can also be viewed as a flowchart illustrating the flow of operations of a method for performing IQ calibration in a receiver. As shown, a signal R(F) 51 is received from a channel. The channel may be either a wired channel or a wireless channel.

In at least one embodiment, the received signal R(F) is a Type II probe signal that was transmitted by the remote transmitter. Referring to FIG. 3, the received signal R(F) may first be directed to an analog to digital converter (ADC) 52 to convert the signal from an analog format to a digital format. Once in a digital format, the signal may be delivered to a preamble process unit 54 which performs operations related to the preamble of the signal, such as, for example, automatic gain control (AGC), frequency and timing synchronization, and/or others. After preamble processing, the signal may now be directed to a fast Fourier transform unit (FFT) 56, or other discrete Fourier transform unit, to convert the signal from the time domain to the frequency domain to prepare the signal for further processing. The frequency domain signal is now delivered to the channel estimation unit 58 to generate a channel estimate for the channel.

Next, the signals undergo frequency domain equalization 60. After equalization, a common phase error is estimated 62 and corrected for 64. The IQ calibration 66 is then performed within the receiver. As described previously, during the IQ calibration, the phase and gain of the IQ imbalance is first determined for each of the frequencies F1, F2 of the Type II probe. The slope of the phase imbalance and the slope of the gain imbalance may then be found. The y intercept of the phase and gain imbalance may then be determined. The intercept and slope of the phase and gain imbalance may then be used to generate expressions for a(F) and b(F) for each tone frequency used in the multicarrier system, as described previously. After the IQ calibration has been performed, the signals may be demapped and decoded 68.

Figure 4:
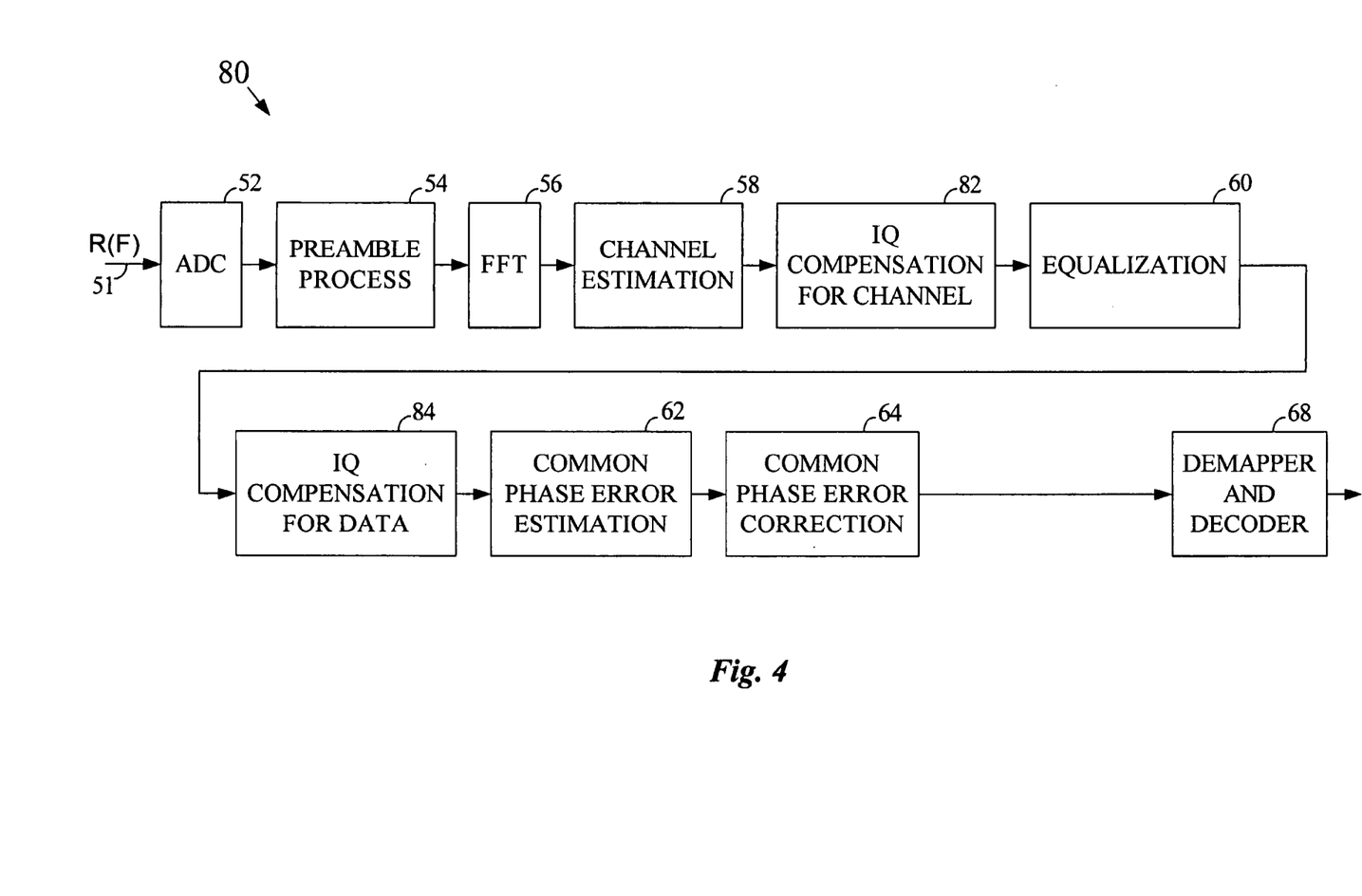
FIG. 4 is a block diagram illustrating an example receiver apparatus that is capable of performing transmitter IQ compensation for a remote transmitter in accordance with an embodiment of the present invention.

After the IQ calibration has been performed in the receiver, IQ compensation may be initiated. FIG. 4 is a block diagram illustrating an example receiver apparatus 80 that may perform transmitter IQ compensation for a remote transmitter in accordance with an embodiment of the present invention. The receiver apparatus 80 may be the same apparatus 50 that was used to perform the IQ calibration (see FIG. 3), reconfigured to perform IQ compensation. As before, a signal R(F) 51 is first received from a channel. In this case, however, the signal R(F) may include user data on more than 2 of the multicarrier tones. The received signal R(F) may then be processed through the ADC 52, the preamble process 54, the FFT 56, and the channel estimator 58 as described previously. IQ compensation may then be performed for the channel 82. As described previously, the following equation may be used to perform the IQ compensation for the channel:

$$\tilde{H}(F) = \frac{\hat{H}(F)}{a(F) + b(F)C(F)C^*(-F)}$$

$$= \begin{cases} \hat{H}(F) & \text{when } C(F)C^*(-F) = 1 \\ \frac{\hat{H}(F)}{(1 + \varepsilon(F))e^{-j\alpha(F)}} & \text{when } C(F)C^*(-F) = -1 \end{cases}$$

The above equation may be evaluated for each of the tones of interest in the system (e.g., each of the tones that are carrying user data). After the channel has been compensated, frequency domain equalization 60 may be performed. Then, IQ compensation for the transmitted data 84 may be undertaken. As described previously, the following equation may be used to compensate for the data at tone F:

$$Z(F) = \frac{a^*(-F)\hat{Z}(F) - b(F)\hat{Z}^*(-F)}{a^*(-F)a(F) - b(F)b^*(-F)}.$$

The values for a and b at a particular frequency may be found using the following equations:

$$a(F) = \frac{1 + (1 + \hat{\varepsilon}(F))e^{-j\hat{\alpha}(F)}}{2}$$

$$b(F) = \frac{1 - (1 + \hat{\varepsilon}(F))e^{-j\hat{\alpha}(F)}}{2}$$

After the data has been IQ compensated, the common phase error may be estimated 62 and corrected for 64, as described previously. The signals may then be demapped and decoded 68.

The techniques and structures of the present invention may be implemented in any of a variety of different forms. For example, features of the invention may be embodied within various forms of communication devices, both wired and wireless; television sets; set top boxes; audio/video devices; laptop, palmtop, desktop, and tablet computers with or without wireless capability; personal digital assistants (PDAs); telephones; pagers; satellite communicators; cameras having communication capability; network interface cards (NICs) and other network interface structures; base stations; wireless access points; integrated circuits; as instructions and/or data structures stored on machine readable media; and/or in other formats. Examples of different types of machine readable media that may be used include floppy diskettes, hard disks, optical disks, compact disc read only memories (CD-ROMs), digital video disks (DVDs), Blu-ray disks, magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data.

It should be appreciated that the individual blocks illustrated in the block diagrams herein may be functional in nature and do not necessarily correspond to discrete hardware elements. For example, in at least one embodiment, two or more of the blocks are implemented in software within a single digital processing device. The digital processing device may include, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above. Hardware, software, firmware, and hybrid implementations may be used.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A computer implemented method comprising:
receiving a Type II probe signal from a remote transmitter at a receiver in a Multimedia over Coax Alliance (MoCA) based network using multicarrier communication, said Type II probe signal having known calibration data on two tones thereof at frequencies F1 and F2; and
calibrating said receiver for IQ imbalance in said remote transmitter using said received Type II probe signal, wherein calibrating said receiver for IQ imbalance in said remote transmitter using said received Type II probe signal includes:
estimating a phase and gain of said IQ imbalance in said remote transmitter at frequency F1 using said received Type II probe signal; and
estimating a phase and gain of said IQ imbalance in said remote transmitter at frequency F2 using said received Type II probe signal.

2. The method of claim 1, wherein calibrating said receiver for IQ imbalance in said remote transmitter using said received Type II probe signal further includes:
calculating an estimated phase slope using said estimated phase of said IQ imbalance at frequency F2 and said estimated phase of said IQ imbalance at frequency F1.

3. The method of claim 2, wherein calibrating said receiver for IQ imbalance in said remote transmitter using said received Type II probe signal further includes:
calculating an estimated gain slope using said estimated gain of said IQ imbalance at frequency F2 and said estimated gain of said IQ imbalance at frequency F1.

4. The method of claim 3, wherein calibrating said receiver for IQ imbalance in said remote transmitter using said received Type II probe signal further includes:
calculating a y intercept of a phase line of said IQ imbalance in said remote transmitter using said estimated phase slope and said estimated phase at one of frequency F1 and frequency F2, wherein said estimated phase slope and said y intercept of said phase line allow a phase of said IQ imbalance in said remote transmitter to be estimated for any tone of a multicarrier signal.

5. The method of claim 4, wherein calibrating said receiver for IQ imbalance in said remote transmitter using said received Type II probe signal further includes:
calculating a y intercept of a gain line of said IQ imbalance in said remote transmitter using said estimated gain slope and said estimated gain at one of frequency F1 and frequency F2, wherein said estimated gain slope and said y intercept of said gain line allow a gain of said IQ imbalance in said remote transmitter to be estimated for any tone of a multicarrier signal.

6. The method of claim 1, further comprising:
receiving a multicarrier signal from said remote transmitter at said receiver, said multicarrier signal having data on a tone at frequency F3; and
compensating, at said receiver, for transmit IQ imbalance from said remote transmitter in said received multicarrier data signal.

7. The method of claim 6, wherein compensating for transmit IQ imbalance includes:
calculating the recovered data Z(F3) for the tone at frequency F3 as follows:

$$Z(F3) = \frac{a^*(-F3)\hat{Z}(F3) - b(F3)\hat{Z}^*(-F3)}{a^{*A}(-F3)a(F3) - b(F3)b^*(-F3)}$$

wherein $$a(F) = \frac{1 + (1 + \hat{\varepsilon}(F))e^{-j\hat{\alpha}(F)}}{2};$$

$$b(F) = \frac{1 - (1 + \hat{\varepsilon}(F))e^{-j\hat{\alpha}(F)}}{2}; \text{ and}$$

wherein $(1+\hat{\varepsilon}(F))$ is the estimated IQ gain imbalance at frequency F and $\hat{\alpha}(F)$ is the estimated IQ phase imbalance at frequency F.

8. An article comprising a computer readable storage medium having computer executable instructions stored thereon that, when executed by a computing platform, perform a method as follows:
  receiving a Type II probe signal from a remote transmitter at a receiver in a Multimedia over Coax Alliance (MoCA) based network using multicarrier communication, said Type II probe signal having known calibration data on two tones thereof at frequencies F1 and F2; and
  calibrating said receiver for IQ imbalance in said remote transmitter using said received Type II probe signal, wherein calibrating said receiver for IQ imbalance in said remote transmitter using said received Type II probe signal includes:
    estimating a phase and gain of said IQ imbalance in said remote transmitter at frequency F1 using said received Type II probe signal; and
    estimating a phase and gain of said IQ imbalance in said remote transmitter at frequency F2 using said received Type II probe signal.

9. The article of claim 8, wherein calibrating said receiver for IQ imbalance in said remote transmitter using said received Type II probe signal further includes:
  calculating an estimated phase slope using said estimated phase of said IQ imbalance at frequency F2 and said estimated phase of said IQ imbalance at frequency F1.

10. The article of claim 9, wherein calibrating said receiver for IQ imbalance in said remote transmitter using said received Type II probe signal further includes:
  calculating an estimated gain slope using said estimated gain of said IQ imbalance at frequency F2 and said estimated gain of said IQ imbalance at frequency F1.

11. The article of claim 10, wherein calibrating said receiver for IQ imbalance in said remote transmitter using said received Type II probe signal further includes:
  calculating a y intercept of a phase line of said IQ imbalance in said remote transmitter using said estimated phase slope and said estimated phase at one of frequency F1 and frequency F2, wherein said estimated phase slope and said y intercept of said phase line allow a phase of said IQ imbalance in said remote transmitter to be estimated for any tone of a multicarrier signal.

12. The article of claim 11, wherein calibrating said receiver for IQ imbalance in said remote transmitter using said received Type II probe signal further includes:
  calculating a y intercept of a gain line of said IQ imbalance in said remote transmitter using said estimated gain slope and said estimated gain at one of frequency F1 and frequency F2, wherein said estimated gain slope and said y intercept of said gain line allow a gain of said IQ imbalance in said remote transmitter to be estimated for any tone of a multicarrier signal.

13. The article of claim 8, wherein said method further includes:
  receiving a multicarrier signal from said remote transmitter at said receiver, said multicarrier signal having data on a tone at frequency F3; and
  compensating, at said receiver, for transmit IQ imbalance from said remote transmitter in said received multicarrier data signal.

14. The article of claim 13, wherein compensating for transmit IQ imbalance includes:
  calculating the recovered data Z(F3) for the tone at frequency F3 as follows:

$$Z(F3) = \frac{a^*(-F3)\hat{Z}(F3) - b(F3)\hat{Z}^*(-F3)}{a^*(-F3)a(F3) - b(F3)b^*(-F3)}$$

wherein $$a(F) = \frac{1 + (1 + \hat{\varepsilon}(F))e^{-j\hat{\alpha}(F)}}{2};$$

$$b(F) = \frac{1 - (1 + \hat{\varepsilon}(F))e^{-j\hat{\alpha}(F)}}{2}; \text{ and}$$

wherein $(1+\hat{\varepsilon}(F))$ is the estimated IQ gain imbalance at frequency F and $\hat{\alpha}(F)$ is the estimated IQ phase imbalance at frequency F.

15. A communication device comprising:
  an IQ channel compensation unit to compensate a channel estimate for transmit IQ imbalance from a remote transmitter; and
  an IQ data compensation unit to compensate received data for transmit IQ imbalance from said remote transmitter, wherein said IQ data compensation unit includes means for calculating recovered data Z(F3) for a tone at frequency F3 as follows:

$$Z(F3) = \frac{a^*(-F3)\hat{Z}(F3) - b(F3)\hat{Z}^*(-F3)}{a^*(-F3)a(F3) - b(F3)b^*(-F3)}$$

wherein $$a(F) = \frac{1 + (1 + \hat{\varepsilon}(F))e^{-j\hat{\alpha}(F)}}{2};$$

$$b(F) = \frac{1 - (1 + \hat{\varepsilon}(F))e^{-j\hat{\alpha}(F)}}{2}; \text{ and}$$

wherein $(1+\hat{\varepsilon}(F))$ is the estimated IQ gain imbalance at frequency F and $\hat{\alpha}(F)$ is the estimated IQ phase imbalance at frequency F.

16. The communication device of claim 15, further comprising:
  an IQ calibration unit to calibrate said communication device for transmit IQ imbalance from said remote transmitter.

17. The communication device of claim 16, wherein:
  said IQ calibration unit uses a Multimedia over Coax Alliance (MoCA) Type II probe signal received from said remote transmitter to calibrate said communication device, said Type II probe signal having known calibration data on two tones thereof at frequencies F1 and F2.

18. A computer implemented method comprising:
  receiving a Type II probe signal from a remote transmitter at a receiver in a Multimedia over Coax Alliance (MoCA) based network using multicarrier communication, said Type II probe signal having known calibration data on two tones thereof at frequencies F1 and F2; and calibrating said receiver for IQ imbalance in said remote transmitter using said received Type II probe signal;

receiving a multicarrier signal from said remote transmitter at said receiver, said multicarrier signal having data on a tone at frequency F3; and compensating, at said receiver, for transmit IQ imbalance from said remote transmitter in said received multicarrier data signal.

19. The method of claim 18, wherein compensating for transmit IQ imbalance includes:

calculating the recovered data Z(F3) for the tone at frequency F3 as follows:

$$Z(F3) = \frac{a^*(-F3)\hat{Z}(F3) - b(F3)\hat{Z}^*(-F3)}{a^*(-F3)a(F3) - b(F3)b^*(-F3)}$$

wherein $$a(F) = \frac{1 + (1 + \hat{\varepsilon}(F))e^{-j\hat{\alpha}(F)}}{2};$$

$$b(F) = \frac{1 - (1 + \hat{\varepsilon}(F))e^{-j\hat{\alpha}(F)}}{2}; \text{ and}$$

wherein $(1+\hat{\varepsilon}(F))$ is the estimated IQ gain imbalance at frequency F and $\hat{\alpha}(F)$ is the estimated IQ phase imbalance at frequency F.

20. An article comprising a computer readable storage medium having computer executable instructions stored thereon that, when executed by a computing platform, perform a method as follows:

receiving a Type II probe signal from a remote transmitter at a receiver in a Multimedia over Coax Alliance (MoCA) based network using multicarrier communication, said Type II probe signal having known calibration data on two tones thereof at frequencies F1 and F2; and calibrating said receiver for IQ imbalance in said remote transmitter using said received Type II probe signal;

receiving a multicarrier signal from said remote transmitter at said receiver, said multicarrier signal having data on a tone at frequency F3; and compensating, at said receiver, for transmit IQ imbalance from said remote transmitter in said received multicarrier data signal.

21. The article of claim 20, wherein compensating for transmit IQ imbalance includes:

calculating the recovered data Z(F3) for the tone at frequency F3 as follows:

$$Z(F3) = \frac{a^*(-F3)\hat{Z}(F3) - b(F3)\hat{Z}^*(-F3)}{a^*(-F3)a(F3) - b(F3)b^*(-F3)}$$

wherein $$a(F) = \frac{1 + (1 + \hat{\varepsilon}(F))e^{-j\hat{\alpha}(F)}}{2};$$

$$b(F) = \frac{1 - (1 + \hat{\varepsilon}(F))e^{-j\hat{\alpha}(F)}}{2}; \text{ and}$$

wherein $(1+\hat{\varepsilon}(F))$ is the estimated IQ gain imbalance at frequency F and $\hat{\alpha}(F)$ is the estimated IQ phase imbalance at frequency F.

* * * * *